United States Patent [19]

Vogel

[11] Patent Number: 4,970,598

[45] Date of Patent: Nov. 13, 1990

[54] METHOD FOR CORRECTING SHADING EFFECTS IN VIDEO IMAGES

[75] Inventor: Richard M. Vogel, Pittsford, N.Y.

[73] Assignee: Eastman Kodak Company, Rochester, N.Y.

[21] Appl. No.: 358,286

[22] Filed: May 30, 1989

[51] Int. Cl.⁵ .......................................... H04N 3/14
[52] U.S. Cl. .............................. 358/213.18; 358/163
[58] Field of Search ................... 358/312.15–213.18, 358/163

[56] References Cited

U.S. PATENT DOCUMENTS

| | | | |
|---|---|---|---|
| 2,166,712 | 7/1939 | Bedford | 358/163 |
| 2,338,646 | 1/1942 | Kessler | 358/163 |
| 2,658,104 | 11/1953 | Smith | 358/163 |
| 3,800,078 | 3/1974 | Cochran et al. | 178/7.1 |
| 3,902,011 | 8/1975 | Pieters et al. | 178/7.2 |
| 4,032,975 | 6/1977 | Malueg et al. | 178/7.1 |
| 4,167,755 | 9/1979 | Nagumo | 358/213 |
| 4,216,503 | 8/1980 | Wiggins | 358/280 |
| 4,343,021 | 8/1982 | Frame | 358/213 |
| 4,392,157 | 7/1983 | Garcia | 358/213 |
| 4,396,938 | 8/1983 | Dischert | 358/21 R |
| 4,633,314 | 12/1986 | Kurata et al. | 358/163 |
| 4,695,884 | 9/1987 | Anastassiou et al. | 358/163 |
| 4,698,685 | 10/1987 | Beaverson | 358/213.15 |
| 4,731,652 | 3/1988 | Yamanaka | 358/163 |

OTHER PUBLICATIONS

IEEE Standard Dictionary of Electrical and Electronics Terms, Jul. 1988-p. 984.

*Primary Examiner*—Stephen Brinich
*Attorney, Agent, or Firm*—Dennis R. Arndt

[57] ABSTRACT

This invention is directed to reducing the size of the memory required to store correction information, by defining the two-dimensional non-uniformity characteristics in terms of two functions that are orthogonal. The orthogonal correction functions are stored in separate memories. During a scan, a pixel counter addresses the X memory while a line counter addresses the Y memory. The correction factors thus obtained are applied sequentially to correct the pixel data value at the current X and Y coordinates.

5 Claims, 8 Drawing Sheets

METHOD FOR CORRECTING SHADING EFFECTS IN VIDEO IMAGES

CROSS REFERENCE TO RELATED APPLICATIONS

Reference is made herein to commonly assigned, copending U.S. Patent Application Ser. No. 358,284, entitled APPARATUS FOR CORRECTING SHADING EFFECTS IN VIDEO IMAGES, in the name of R. M. Vogel, filed concurrently herewith.

TECHNICAL FIELD

The present invention relates to document retrieval systems in general which capture an image of a document in electronic form using linear CCD imagers or a CCD array, and more specifically, defining the two-dimensional, non-uniformity characteristics of this system in terms of two orthogonal correction functions stored in separate memories, thereby reducing the total size of the memory required to store the shading correction information.

BACKGROUND OF THE INVENTION

Document retrieval systems typically apply sophisticated processing algorithms to a document which has been captured in digital form. For example, some algorithms may involve thresholding of the data to remove background areas of the document or generation of histograms for exposure control. Any non-uniformity in the retrieval system will effect the captured data and may result in false decisions by these processing algorithms.

One well known and well defined source of non-uniformity can be introduced by using a lens to focus the image onto the image capture device. The resulting non-uniformity is characterized by the "$\cos^4$" law which is well known in the optical art.

Complex lenses which may consist of multiple lens elements, apertures, etc. may not directly obey the above-mentioned law but will have a characteristic that is repeatable from lens to lens during the manufacturing process.

Non-uniformities which are not well defined may arise from other sources also. Some examples are: CCD pixel sensitivity variation which may on the order of 5-10% and spot uniformities that may occur in an illumination source such as by a lamp filament.

Many methods have been previously disclosed which correct for the combined effects of illumination system non-uniformity and CCD pixel sensitivity variation.

In U.S. Pat. No. 4,392,157, granted in the name of Garcia et al discloses a technique whereby a two-dimensional scan region is divided into groups of pixels. Those groups which have responses that deviate more than a certain amount from a mean value will be corrected. The location of the groups to be corrected is encoded as a distance from the last group which was corrected. This method conserves memory space but the overall correction may be somewhat course if the memory is small. Conversely, the memory requirement will become large as finer correction resolution is applied.

U.S. Pat. No. 4,343,021, in the name of Frame discloses a technique whereby the two-dimensional scan area is again divided into an arbitrary number of elements. A correction factor is determined for each element during a calibration scan and used to correct the response of each group during the subsequent scans. This method again suffers from a memory requirement that grows as the correction resolution increases.

U.S. Pat. 3,902,011, to Pieters et al discloses a technique whereby a number of spaced apart points in the two-dimensional scan area are sampled. A correction factor is determined for each point. During subsequent scans, the correction factors are used in conjunction with interpolation to arrive at a better correction factor for each pixel. Interpolation gives a better correction than that disclosed by Frame for a given memory size. If a better correction factor is required for the actual non-uniformity, then the memory size again could become very large.

The prior art as exemplified by the aforementioned three patents has illustrated various techniques that attempt to reduce the amount of memory required for storing correction factors. These techniques all suffer from the fact that the number of required memory locations increases as the square of the linear resolution. For example, a system with a resolution of 10 elements along both the X and Y scan directions would required 100 memory locations (10×10). If the X and Y scan resolutions were doubled to 20 elements, the memory requirement would increase to 400 locations (20×20), a four-fold increase! If the X and Y scan resolutions were again doubled to 40 elements, the memory requirement would increase to 1600 locations (40×40), a sixteen-fold increase!

DISCLOSURE OF THE INVENTION

The present invention overcomes the requirement that the number of memory locations increases as the square of the linear resolution. This is accomplished by defining the two-dimensional non-uniformity characteristics in terms of two functions which are orthogonal. The orthogonal correction functions are then determined and stored in separate memories.

During a scan, a pixel counter addresses the X memory while a line counter addresses the Y memory. The correction factors thus obtained are applied sequentially to correct the pixel data value at the current X and Y coordinates. Data may be in linear or logarithmic form and correction factors may be applied as a multiplier or offset respectively.

MODES OF CARRYING OUT THE INVENTION

In the present description of the invention it has been assumed that the effects of dark current signals have been previously removed. A number of techniques are known in the prior art for this purpose and will not be discussed at this time.

Also not considered is the absolute control of illumination level and once again many techniques are available in the art for exposure control in conjunction with a charge coupled device (CCD) image scanner.

The nonuniformity reduction technique disclosed herein is independent of the absolute exposure level and will not interfere with external exposure control algorithms like some automatic gain control (AGC) type correction techniques.

Figure 1:
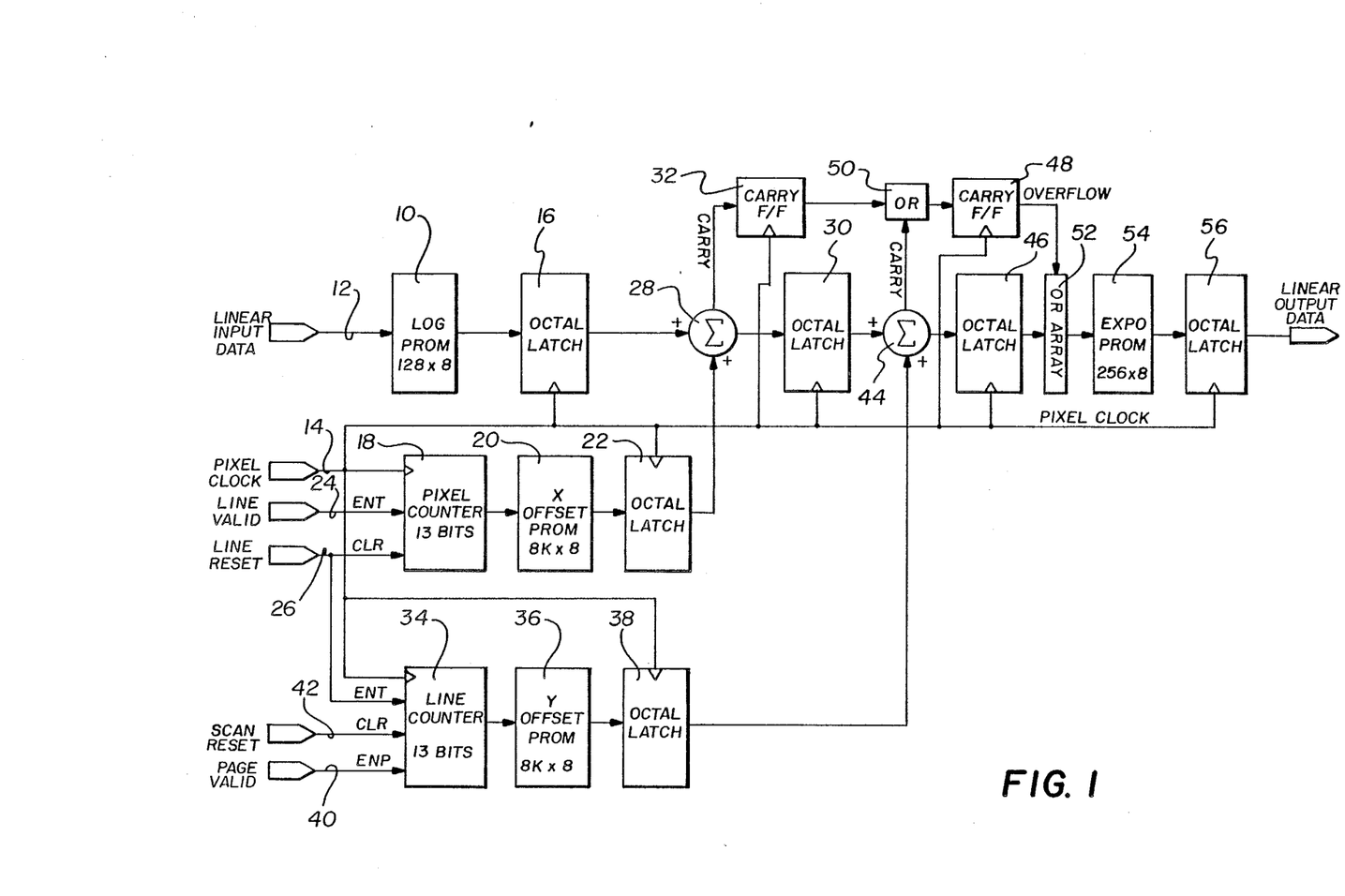
FIG. 1 is a functional block diagram illustrating a preferred embodiment of the present invention.

With reference to FIG. 1, a functional block diagram for a preferred embodiment of the present invention is shown. Bit resolution of the various counters and programmable read only memories (PROMs) are specified and sized appropriately for use with a linear scanner having a resolution of 4800 elements in both the horizontal (X) and vertical (Y) directions.

Various PROMs are discussed in conjunction with the present invention. It should be understood that the data stored in each of these PROM's has been determined on the use of a particular optical system and a specific CCD image scanner or two dimensional array.

Input data from the image capture device is converted to logarithmic form by Log PROM 10. Input data is inputted on line 12 to Log PROM 10 each cycle of the pixel clock which appears on line 14. The pixel clock operates at a rate of approximately 8 MHz. The result of each logarithmic conversion outputted from log PROM 10 is loaded into octal latch 16 on the next pixel clock cycle.

Concurrently, with the arrival of each new input pixel data the pixel counter 18 is incremented. The output of pixel counter 18 is used to address a new memory location in the X offset PROM 20. Each addressed memory location in offset PROM 20 contains an offset value which, when added to the incoming pixel data value, will compensate for both the sensitivity variation of the linear scanner at that pixel location as well as the X component of the optical system illumination nonuniformity associated with that pixel location. The X offset value from PROM 20 is loaded into octal latch 22 on the next pixel clock cycle.

The pixel counter 18 is only allowed to increment when valid data samples are available because there may be more pixel clock cycles than data during any given scan line. This allows conservation of memory. The line valid signal on line 24 functions to enable pixel counter 18 only when valid data samples are available. A Line Reset signal is applied to synchronously clear pixel counter 18 via line 26 at the end of each scan line.

The pixel data from latch 16 and its corresponding correction offset value from latch 22 are simultaneously inputted to 8 bit adder 28. The result of the combination is then loaded into octal latch 30 during the next pixel clock cycle.

If an overflow occurs in adder 28, it will cause carry flip-flop 32 to be set simultaneously with the data loaded into latch 30.

A line counter 34 is incremented each time pixel counter 18 is reset. Line counter 34 outputs are used to address memory locations in the Y offset PROM 36. The appropriate memory location contains an offset value which, when added to the incoming pixel data, will correct for the Y component of the optical system illumination nonuniformity at that pixel. The Y offset value from PROM 36 is loaded into octal latch 38 during the next pixel clock cycle.

Line counter 34 is only allowed to increment when a document is being scanned. The Page Valid signal on line 40 enables line counter 34. The Scan Reset signal on line 42 is applied to synchronously clear line counter 34 at the end of each line scan.

The data from octal latch 30 and the corresponding Y correction offset value from octal latch 38 are simultaneously inputted to 8 bit adder 44. The result of this combination is loaded in octal latch 46 during the next clock cycle.

If an overflow occurs in adder 44 it would result in the carry flip-flop 48 to be set simultaneously with the data loaded into latch 46. Double input OR gate 50 allows flip-flop 48 to be set also in the event an overflow occurred on an earlier correction.

The corrected data in log format present in octal latch 46 is sent to an octal two-input OR array 52 where the 8 bits can be forced to logic 1 if an overflow occurred during the correction process. If this operation were not performed, the resulting data would appear as near-black points when they are, in fact, "whiter-than-white".

Expo PROM 54 converts the data from logarithmic format to a linear format. The result of the conversion is loaded into octal latch 56 during the next cycle of the pixel clock.

The use of clocked octal latches 16, 22, 30, 38, 46, and 56 and clocked carry flip-flops 32 and 48 allows digital processing to take place synchronously with the pixel clock while running at very high speeds. Such a technique is called "pipelining" and is well known in digital signal processing.

Figure 2:
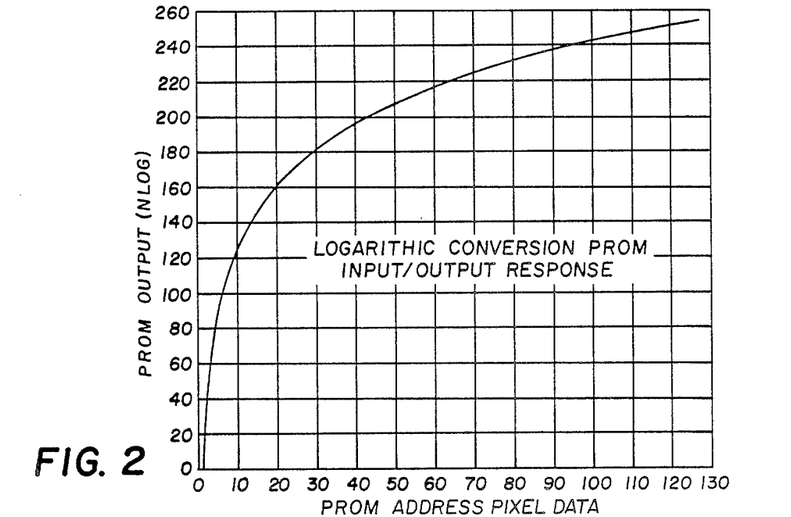
FIG. 2 is a graph of PROM output versus PROM address input for logarithmic conversion.

FIG. 2 illustrates the input/output response for the log conversion PROM 10 shown in FIG. 1. Digital output data from the image capture device is applied as an address to PROM 10. The input/output response of PROM 10 is described by the following equation:

$$*Nlog = (2^N - 1)[LN(pixel\ data)/2^M - 1) + YG]/YG$$

where:

LN = Natural logarithm function

Y = Conversion factor between the base-ten and natural logarithm functions Y = LN (10).

G = A factor which specifies the dynamic range available in the PROM 10 input signal.

M = Image capture device A/D converter resolution in bits.

N = Logarithmic conversion PROM output resolution in bits.

$$0 \leq Nlog \leq 2^N - 1$$

$$0 \leq pixel\ data \leq 2^M - 1$$

since LN(0) is not defined . . . let $LN(0) = LN[1/(2^M - 1)]$

* The end result of the calculations is rounded to the nearest integer.

If the A/D converter is the dynamic range limiter then $$G = (6M + 1.8)/20$$

otherwise G equals the dynamic range at the A/D converter input divided by 20.

For example, if the dynamic range of the signal at the A/D input is 60db and the A/D resolution is 7 bits then the A/D converter is clearly the dynamic range limiter since its signal-to-quantization noise level is $$(6) \times (7) + 1.8 = 43.8 db$$

In this case $$G = (6) \times (7) + 1.8)/20 = 2.19$$

However, if the dynamic range of the signal at the input to the same A/D converter were only 30db then the A/D converter would no longer be the dynamic range limiter and $$G = 30/20 = 1.5$$

This method of selecting G allows the full resolution of the logarithmic conversion PROM 10 to be applied to the dynamic range of the PROM input signal.

Figure 3:
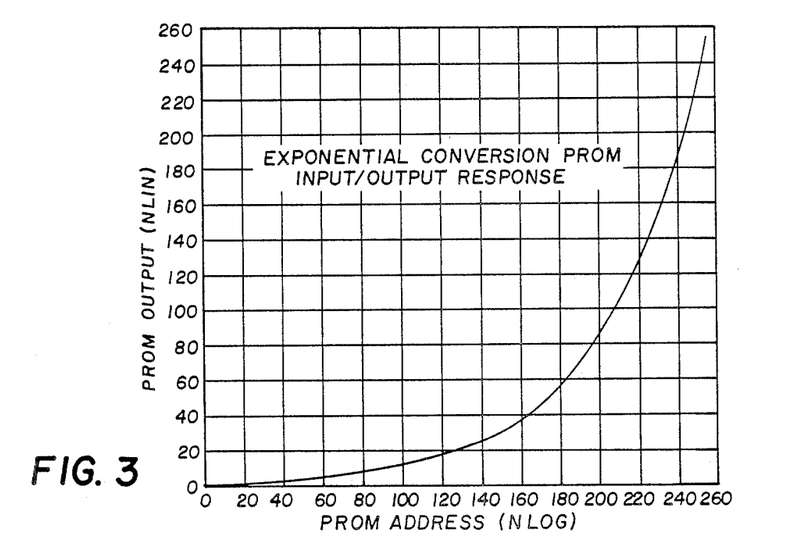
FIG. 3 is a graph of a PROM output versus PROM address input for exponential conversion.

FIG. 3 illustrates the input/output response of the exponential conversion PROM 54 shown in FIG. 1. Its function is to convert the corrected data in logarithmic form back to data in linear form as may be required by subsequent processing algorithms. The input/output response is characterized by the following equation:

$$*Nlin = (2^L - 1) \, EXP \, [YG \, Nlog/(2^N - 1) - YG]$$

where $0 \leq Nlin \leq 2^L - 1$

EXP ™ Exponential function which is the inverse of the natural logarithm function.

L = Exponential conversion PROM 54 output resolution in bits.

* The end result of the calculations is rounded to the nearest integer.

M N Nlog Y and G are as discussed in conjunction with FIG. 1 and its equation.

Figure 5:
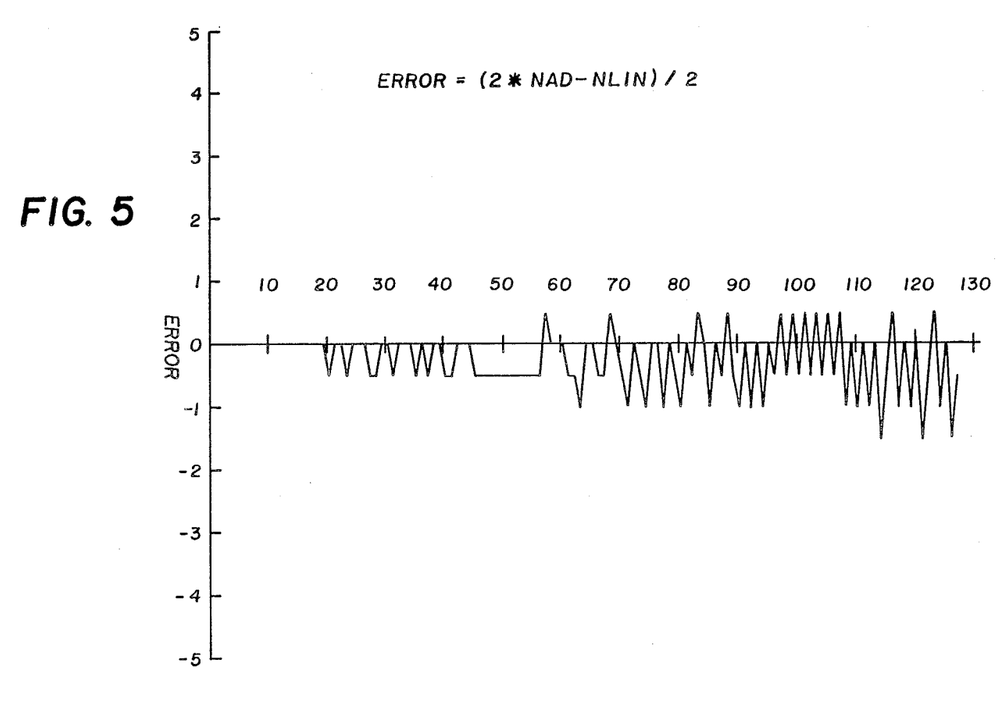
FIG. 5 is a diagram showing the combined error effect of logarithmic and exponential conversion processes.

FIG. 5 illustrates the offset value required to restore the input level to full scale as a function of the input level.

Figure 6:
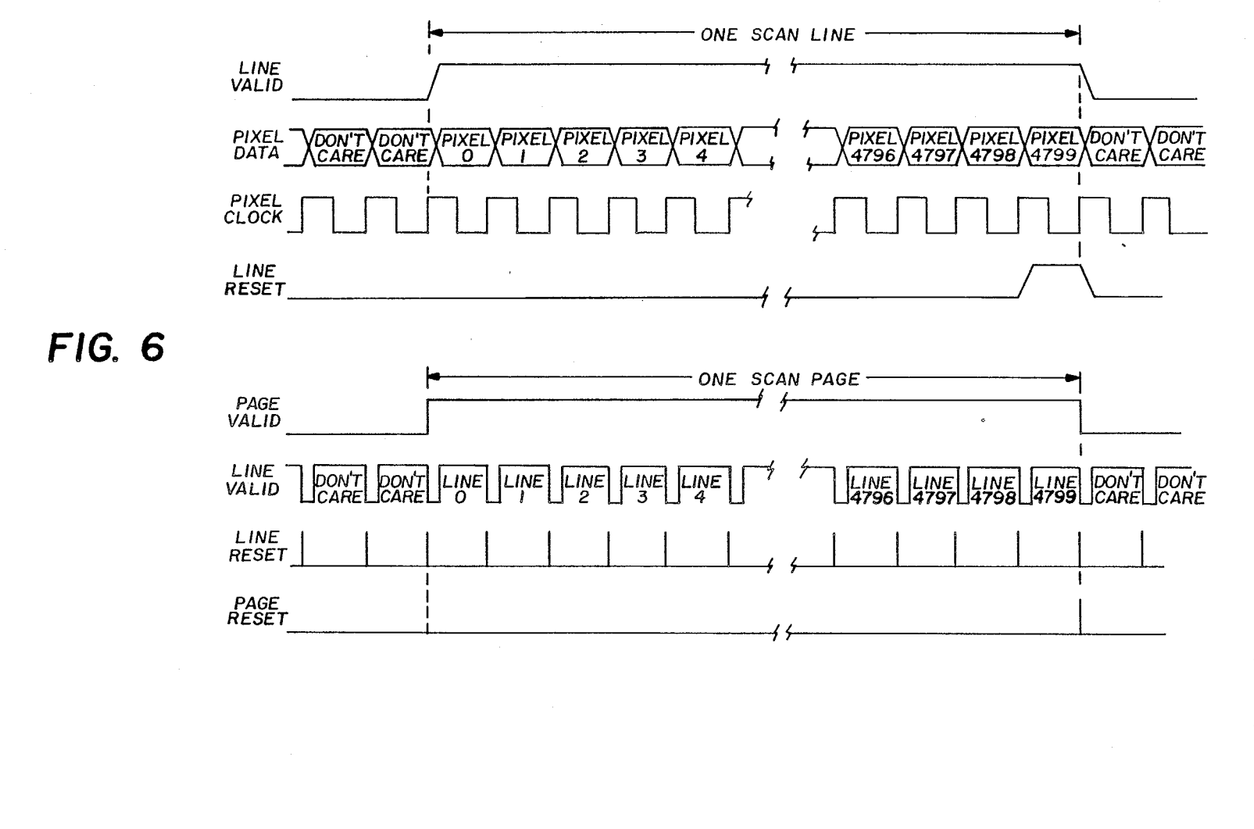
FIG. 6 is a timing chart showing the operating timing sequences of the present invention.

FIG. 6 illustrates the relationship of the various timing signals used in conjunction with the preferred embodiment shown in FIG. 1. These signals are discussed in the description of FIG. 1 and later in FIG. 7.

Figure 7:
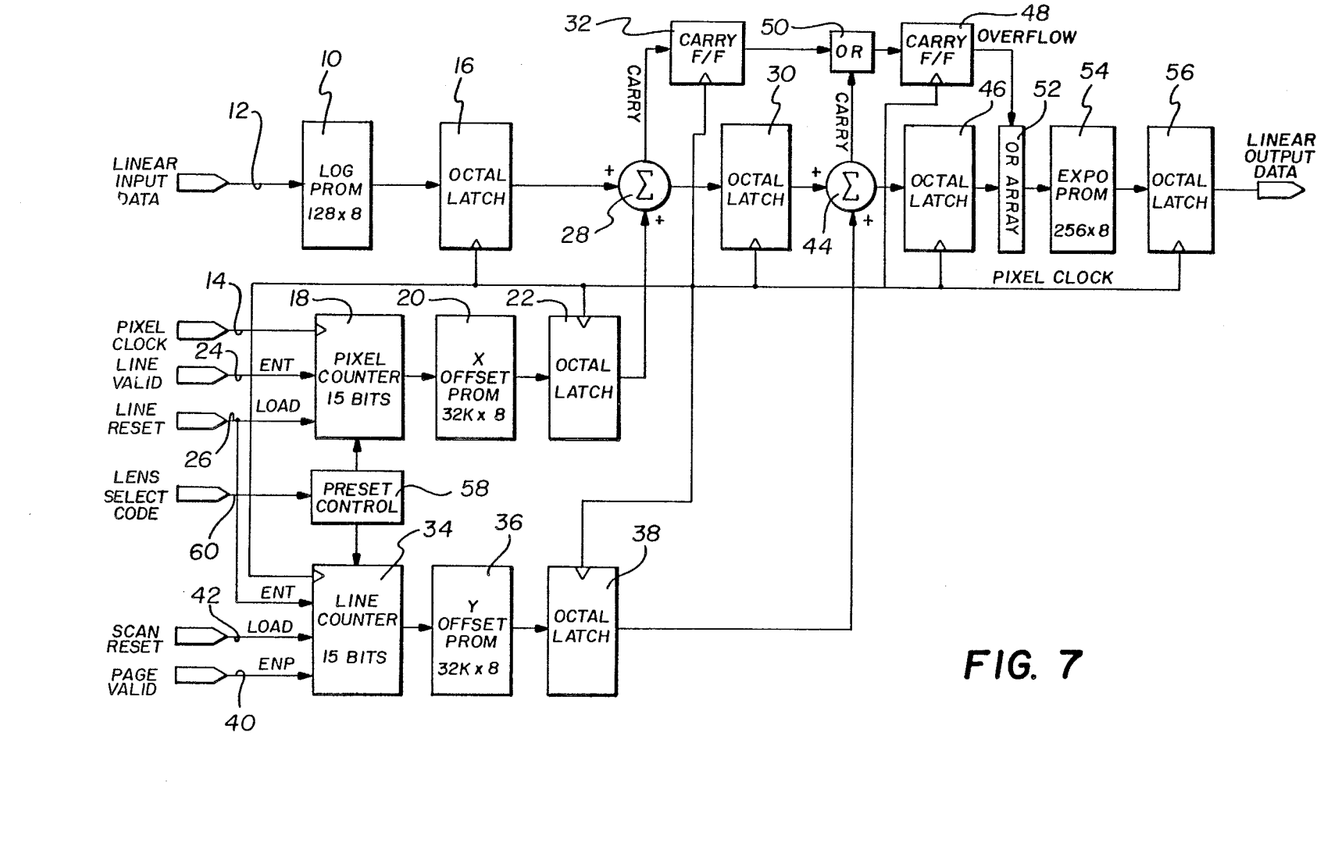
FIG. 7 is a functional block diagram for a preferred embodiment of the present invention for use with multiple lenses.

FIG. 7 illustrates how the system shown in FIG. 1 could be modified to function with multiple lenses. The operation is the same as that described in FIG. 1 with the following exceptions. Operation with six lenses is assumed for the sake of discussion.

In the earlier description, the pixel counter 18 and line counter 34 were cleared at the end of each scan line or scan respectively. With multiple lenses, a predetermined count is loaded into each counter with the count representing the starting address of the block of memory containing the correct offsets for the lens selected.

For example, a 3 bit lens select code appearing on line 60 instructs the preset control logic 58 which lens is being used. Preset control logic 58 then determines the proper preset value to be loaded into each counter 18 and 34.

Figure 8:
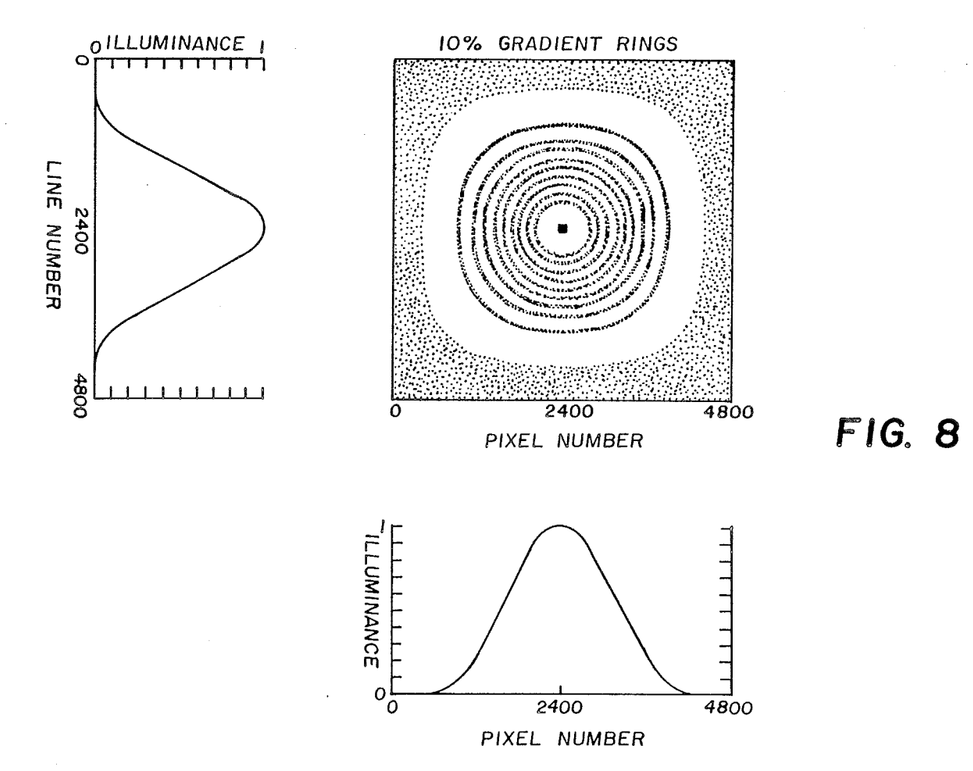
FIG. 8 illustrates how a two dimensional lens fall-off correctional information may be a function of separate orthogonal X and Y fall-off functions.

For a six lens system, 28.8k bytes of memory (4.8k × 6 lenses) would be required for each correction offset PROM 20 and 36 for the X and Y offsets respectively. If the next size memory 32K were to be used, the resolution of each counter 18 and 34 could be increased to 15 bits so as to accommodate the increased address length. FIG. 8 illustrates in a very simple example, a two-dimensional lens fall-off as a function of separate orthogonal X and Y fall-off functions.

In terms of a cartesian co-ordinate system, the illumination at a particular location (X,Y) could be described by:

$I(X,Y) = I(X) \times I(Y)$ where $I(X,Y)$ is the normalized illumination at location (X,Y) and $I(X)$ and $I(Y)$ are the normalized fall-off functions along the lines Y2400 and X2400 respectively in FIG. 8. Along the lines Y2400, the function $I(X)$ is at its maximum and along line the function $I(Y)$ is at its maximum.

Because the fall-off functions are known, the reciprocal functions can be calculated g(X) and g(Y) such that:

$$g(X) \times I(X, 2400) = 1$$

$$g(Y) \times I(2400, Y) = 1$$

Once these reciprocal functions are known, they can be used to correct the normalized data value at a given location as follows:

$$D(X,Y) = \text{pixel data}(X,Y) \times g(X) \times g(Y)$$

We can further define the normalized illumination function in logarithmic form as follows:

| | $I'(X,Y) = I'(X) + I'(Y)$ |
|---|---|
| where | $I'(X,Y) = Ln[I(X,Y)]$ |
| | $I'(X) = Ln[I(X,Y)]$ |
| | $I'(Y) = Ln[I(Y)]$ |

Normalized logarithmic correction functions g'(x) and g'(Y) can then be determined as follows:

$$g'(X) + I'(X, 2400) = 0$$

$$g'(Y) + I'(2400, Y) = 0$$

The correct normalized data value at a given location may then be found as follows:

$$D(X,Y) = e\{Ln[\text{pixel data }(X,Y)] + g'(X) + g'(Y)\}$$

The correction functions g' (X) and g' (Y) are scaled by the factor $(2^N - 1)$ and stored in PROMs 20 and 36 respectively in FIGS. 1 and 7.

Calculation of the correction functions along the lines X2400 and Y2400 results in the best signal-to-noise since the function orthogonal to the correction function being calculated is at its maximum.

Although the preferred embodiment has demonstrated a system with fixed calibration or multiple selectable fixed calibrations, it should be understood that the technique of using orthogonal correction functions to conserve memory is not restricted to this application alone.

Those skilled in the art could apply this technique to any type of two-dimensional photo-electronic image capture device. A second embodiment (FIG. 9) gives another example of how this technique might be applied.

Figure 9:
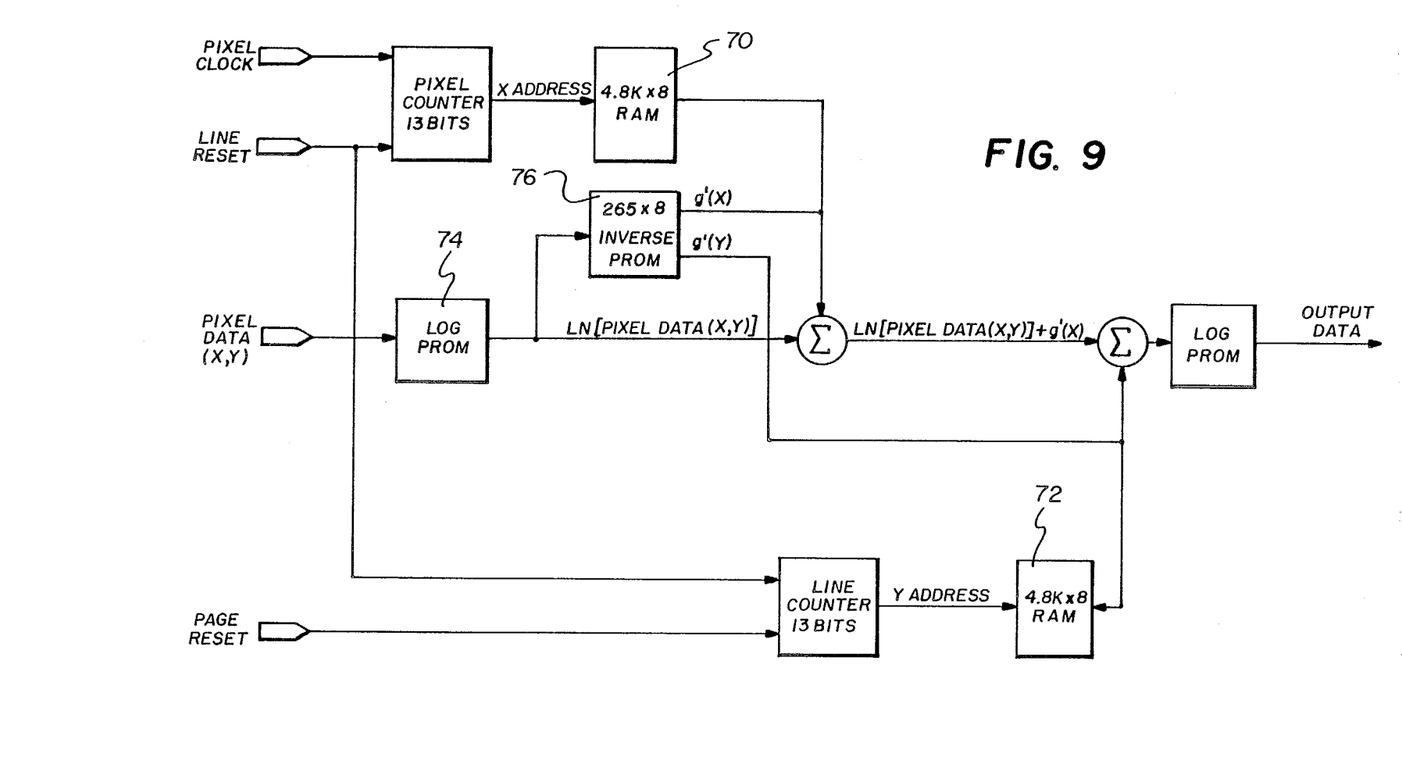
FIG. 9 is a functional block diagram for a second embodiment of the present invention where the correction circuit has the capability of learning the nonuniformity characteristics.

Assuming an image scanning method as previously discussed in conjunction with FIGS. 1 and 7. A functional block diagram is shown in FIG. 9 for the second embodiment. This diagram has been simplified and it should be understood that FIG. 9 would include the data latches, flip-flops and timing signals as shown in FIGS. 1 and 7 to make it fully functional.

This system differs from that in FIGS. 1 and 7 in that RAMs 70 and 72 are used instead of PROMs to store the correction functions. Alternatively, an electrically erasable PROM could also be used instead of RAMs 70 and 72. Unlike the systems shown in FIGS. 1 and 7, the system shown in FIG. 9 is capable of "learning" the system nonuniformity characteristic and therefore requires a calibration scan.

Operation is as follows. Prior to a calibration scan the scan area is illuminated with a uniform field of light at a level which would cause maximum exposure on the image capture device. However, due to sources of non-uniformity as previously discussed, the response of the photo-electronic scanning device will not be uniform across the two-dimensional scan area.

During a scan, pixel data along the line X=2400 (FIG. 8) are used to determine the correction function g'(Y). Along this line the X component of the illumination should be at its maximum and the best signal-to-noise will be achieved.

Figure 4:
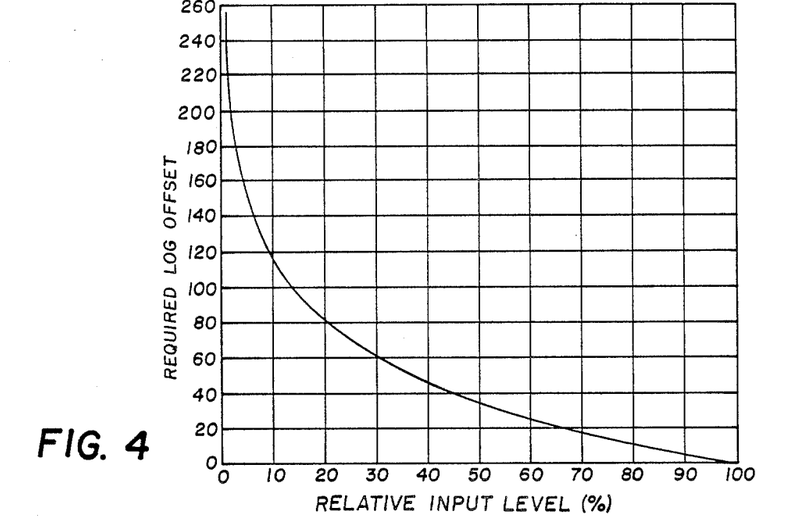
FIG. 4 is a graph of the input level versus the required log offset to restore the input level to full value.

Pixel data at locations (2400,Y) are converted to log format by log PROM 74. Inverse PROM 76 determines the required log offset g' (Y) to restore the data value to full scale. The response of this PROM is as discussed in conjunction with FIG. 4. The correction values are then stored in Y offset memory 36 (FIG. 1) for use in subsequent scans.

During the course of the calibration scan line Y=2400 (FIG. 8) will be reached. Along line Y=2400 the Y component of the illumination should be at its maximum. Pixel data at locations (X,2400) are then converted to log format by log PROM 24. Inverse PROM 76 determines the required log offset g' (X) to restore the data values to full scale. These correction values are then stored in X offset memory 20 (FIG. 1) for use in subsequent scans.

Advantages and Industrial Applicability

The size of the memory required to store correction information is substantially reduced by using orthogonal correction functions. In addition, the correction technique associated with the present invention requires no periodic calibration scan. Product reliability is enhanced because the correction data is not prone to corruption.

Stored correction factors may be in the form of a multiplier to be applied to data in linear form using conventional multiplier integrated circuits. Correction factors may also be in the form of an offset to be applied to data in logarithmic form using conventional adders. In any event, the correction can be applied in the system at a real time rate.

What is claimed is:

1. A method for compensating for two-dimensional non-uniformities in an optical system at each pixel location along a scan line, comprising the steps of:
   establishing two-dimensional non-uniformity characteristics;
   characterize the two-dimensional non-uniformity in terms of two orthogonal functions along first and second orthogonal axes;
   storing in a first memory the correctional factors associated with said first orthogonal axis;
   storing in a second memory the correctional factors associated with said second orthogonal axis;
   accessing said stored correctional factors in said first and second memories according to the coordinates of the pixel being processed; and
   combining the correctional factors obtained from said first and second memories to compensate for nonuniformities at that pixel location.

2. A method of providing shading correction values for an optical system at different pixel locations along a scan line comprising the steps of:
   establish correctional functions associated with each pixel location along a scan line in terms of first and second orthogonal correction functions;
   storing correctional data for said first orthogonal correction function in a first memory;
   storing correctional data for said second orthogonal correction function in a second memory;
   address memory locations in said first memory using the pixel location along said scan line;
   address memory locations in said second memory, using the line count associated with the pixel location;
   combining the correctional factors obtained from each memory to obtain a corrected value for the current pixel being corrected.

3. The method in claim 2 wherein the address for said first memory is the X coordinate on the scan line of the pixel being corrected.

4. The method in claim 2 wherein the address for said second memory is the Y coordinate which is the line count of the scan line containing the pixel being corrected.

5. A method for providing shading correction for an image scanner in which the picture signal level for a reference all white image is different at different locations along a scan line comprising the steps of:
   storing multibit correction data in a pair of orthogonal memories such that the content of each orthogonal value specifies the degree of attenuation of said picture signal level at each pixel element resulting from a one-dimensional correction function contained in each orthogonal memory respectively;
   addressing each memory based on the specific coordinates of the pixel element being corrected to obtain a one-dimensional correction value from each orthogonal memory; and
   combining the multibit correction values to provide a correction factor for each pixel value at its specific coordinate.

* * * * *